United States Patent [19]
Alexander et al.

[11] 3,786,442

[45] Jan. 15, 1974

[54] RAPID RECOVERY CIRCUIT FOR CAPACITIVELY LOADED BIT LINES

[75] Inventors: Stephen B. Alexander, Poughkeepsie, N.Y.; Richard W. Bryant, Santa Clara, Calif.; Robert J. Lipp, Fishkill; George K. Tu, Wappingers Falls, both of N.Y.

[73] Assignee: Cogar Corporation, Wappingers Falls, N.Y.

[22] Filed: Feb. 24, 1972

[21] Appl. No.: 229,132

[52] U.S. Cl. .............. 340/173 R, 307/238, 307/315, 340/173 CA

[51] Int. Cl. .............. G11c 7/00

[58] Field of Search .............. 340/173 FF, 173 CA, 340/173 AM, 173 R; 307/238, 315

[56] References Cited

UNITED STATES PATENTS 3,596,114 7/1971 Maupin .............. 307/315

3,609,712 9/1971 Dennard .............. 340/173 FF

OTHER PUBLICATIONS

Leung, Storage Cell Restore Circuit, 5/70, IBM Technical Disclosure Bulletin, Vol. 12 No. 12, p. 2,213.

Gersbach, Power Supply for Monolithic Memory, 10/70, IBM Technical Disclosure Bulletin, Vol. 13 No. 5, pp. 1,366–1,367.

*Primary Examiner*—Terrell W. Fears

*Assistant Examiner*—Stuart Hecker

*Attorney*—Harry M. Weiss, Gottlieb, Rackman & Reisman

[57] ABSTRACT

There is disclosed a circuit for achieving rapid recovery of the capacitively loaded bit lines of a semiconductor memory. Transistors are provided for driving the lines following a write cycle. The active driving of the bit lines forces them to the same potential so that a read cycle may begin very soon after the termination of a write cycle.

1 Claim, 5 Drawing Figures

RAPID RECOVERY CIRCUIT FOR CAPACITIVELY LOADED BIT LINES

This invention relates to semiconductor memory systems, and more particularly to circuits for ensuring a rapid recovery of the bit lines following a write cycle.

In a typical semiconductor memory, a pair of bit lines (usually considered to be along a column of an array) may be connected to any one of many memory cells. In order to read or write a bit, the bit lines are first coupled to a selected cell. Initially, the two lines in the bit-line pair are held at the same potential. To write a bit in the selected cell, differential signals are applied to the two conductors in the bit-line pair, the polarities of the signals depending on the value of the bit to be written. In the case of a read operation, the state of the cell causes differential currents to flow through the two conductors in the bit-line pair; the polarities of the two currents indicate the value of the bit stored in the cell, and the polarities are detected by developing potentials across a pair of resistors connected in series with the line conductors.

During a write operation, when differential signals are applied to the two bit-line conductors, at least one of the conductors conducts a relatively large current. Each of the conductors is loaded with stray capacitances, and the large write current discharges these capacitances. Prior to a read operation, the two conductors should be held at the same potential because it is a relatively small potential difference developed across the load resistors which indicates the state of the cell being interrogated. The small potential difference can be completely masked if, following a write operation, both conductors have not "recovered," that is, if the stray capacitances have not recharged. It is because a sufficient time must be allowed for the capacitances to recharge that typical semiconductor memory specifications require a relatively long minimum time interval to elapse following a write operation before a read operation can take place.

Although the problem is present on both a chip level, and on a system or card level, it is on the card level that it is most aggravated. It is the bit lines on a card, which can be coupled to a column of modules (and within each module to any column of cells along a module bit-line pair), and which have the greatest stray capacitances associated with them. Accordingly, although fast recovery circuits of the type described below can be utilized on a chip basis, it is on a card level that fast recovery procedures are most essential.

It is a general object of our invention to provide a recovery circuit for a semiconductor memory which reduces the minimum time which must separate write and read cycles.

A typical sense amplifier for a semiconductor memory includes a potential source which is coupled through two resistors to respective conductors in a bit-line pair. In the quiescent state, both conductors are held at the potential of the source. A pair of transistors is provided, each connected to a respective one of the conductors for forcing it toward ground when a bit of a respective value is to be stored in a cell connected to the bit lines. During a write operation, the stray capacitances associated with at least one of the conductors in the pair are discharged by the write current; after the write operation has terminated, the potentials of the two conductors are different. Before a read operation can take place, it is necessary to recharge the discharged capacitances. This is accomplished automatically by current flowing from the potential source through one of the two resistors to the previously driven conductor in the bit-line pair. The capacitances are charged exponentially in accordance with the time constant determined by the magnitude of the stray capacitances and the magnitude of the associated sense resistor.

In accordance with the principles of our invention, additional recovery transistors are connected to the bit-line conductors. These transistors are turned on at the end of a write cycle and apply recovery potentials to the two conductors. Consequently, the stray capacitances can be charged directly from the recovery transistors rather than through the sense resistors. This substantially reduces the recovery time. The recovery transistors are turned off as soon as the potentials of both conductors are restored to the (same) quiescent value, at which time a read cycle can take place.

It is a feature of our invention to actively drive the bit-line conductors following a write cycle to charge their stray capacitances more rapidly than would otherwise occur were the capacitances to charge through the sense resistors included in the bit line.

Further objects, features and advantages of our invention will become apparent upon consideration of the following detailed description in conjunction with the drawing, in which.

Figure 1:
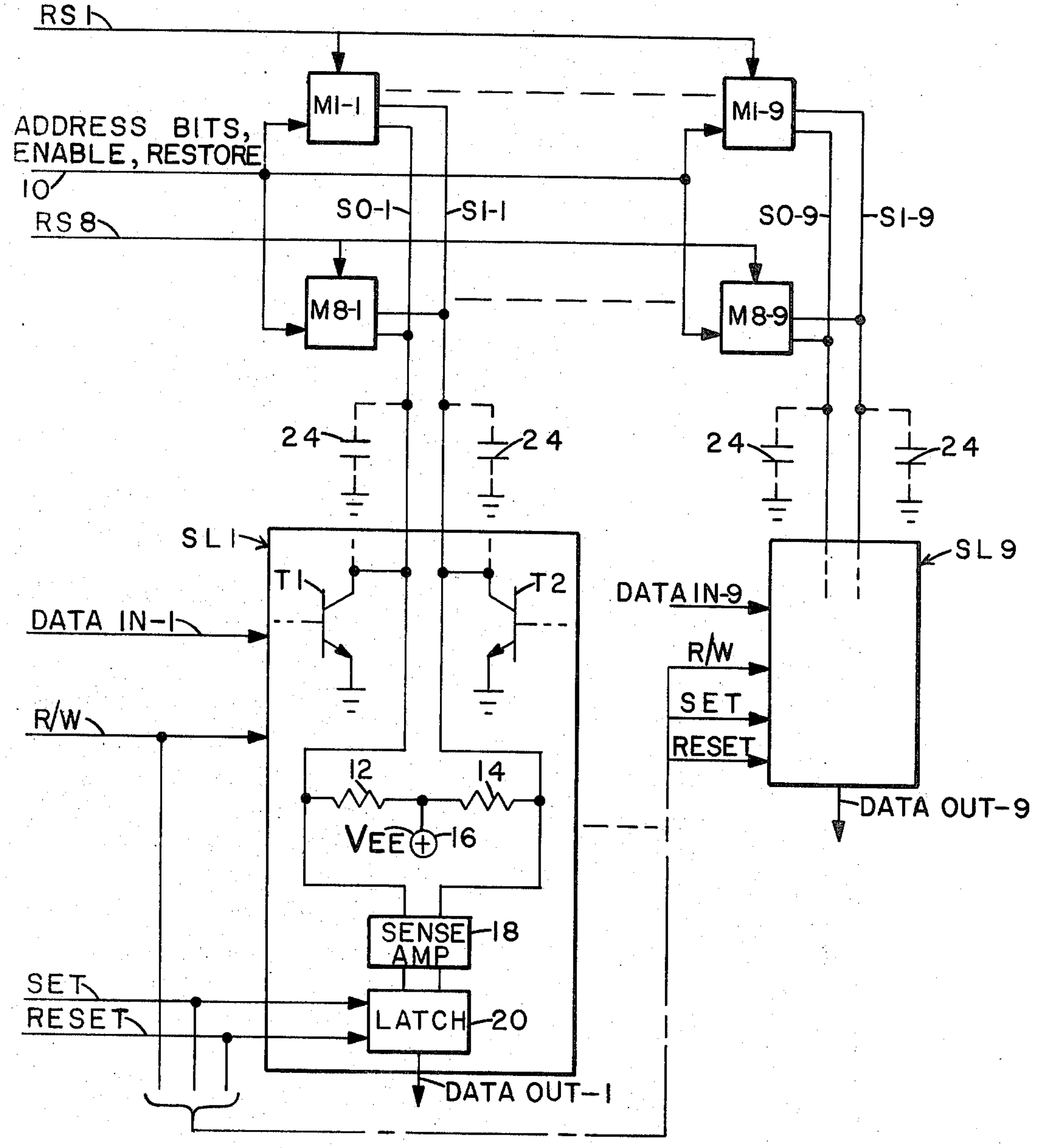
FIG. 1 PRIOR ART
FIG. 1 depicts a prior art semiconductor memory array.

The system of FIG. 1 includes 72 modules M1–1 through M8–9 arranged in eight rows and nine columns. A pair of bit-line conductors (S0– and S1–) is associated with each column of modules and each bit-line conductor pair is extended to a respective one of sense latch modules SL1–SL9. In order to select nine cells in the array for reading or writing a nine-bit word, the address bits on cable 10 are extended to all modules; the same-number cell is thus selected in each of the 72 modules. But only one row of modules is selected for reading or writing purposes, depending upon which one of row select conductors RS1–RS8 is energized. To write a nine-bit word in the array, each sense latch module applies differential currents to its respective bit-line conductors; to read a nine-bit word, each sense latch module determines the relative polarities of the differential currents in its bit-line conductors. The enable and restore signals on cable 10 are also extended to all of the modules, and these are only illustrative of the various timing signals which must be extended to the modules in a typical MOS memory system. The details of the modules themselves and the signals which control their operations are not necessary for an understanding of the present invention; as far as the present invention is concerned, what must be understood is that the application of differential currents to the two conductors in any bit line controls the writing of a bit value in a cell, and the value of a bit already stored in a cell can be determined by sensing the relative magnitudes of the currents in the conductors in any bit line.

The nine sense latch modules SL1–SL9 are identical except that they are coupled to different bit lines. Each module has a respective "data in" conductor whose potential level determines the value of a bit to be stored in a respective cell when a write operation is performed. Similarly, each module is provided with a "data out" conductor whose potential level represents the value of a bit determined during a read operation. The read/write conductor is extended in parallel to all nine sense latch modules and controls either a read operation or a write operation to take place. The set and reset conductors which are also connected in parallel to all sense latch modules simply extend timing pulses to them for controlling the operation of the latch 20 in each of the sense latch modules as is known in the art.

The S0– and S1– conductors in each bit line pair are connected through two respective resistors 12 and 14 to potential source 16 (of magnitude $V_{EE}$). The SO– and S1– conductors are also extended to the inputs of sense amplifier 18. In the quiescent state, the potential of source 16 appears on both conductors. But when a read operation is performed, the two conductors are connected within a module to a selected cell. Currents of different magnitudes flow from source 16 through the two conductors into the cell, the relative magnitudes of the currents depending upon the state of the cell. Consequently, one of the two inputs to sense amplifer 18 goes more negative than the other. The sense amplifier determines the relative polarities of the potentials at its inputs and sets latch 20 accordingly so that the bit value of the selected cell is represented by the potential level of the output conductor.

Two transistors T1 and T2 are provided, the collector of each being connected to a respective one of the bit-line conductors. In order to write a new bit value in a cell, one of the two transistors is turned on by forward-biasing its base-emitter junction. Thus, one of the conductors is pulled down toward the ground level through the turned-on transistor while the potential of the other conductor remains at the level of source 16. Of course, during a write operation sense amplifier 18 detects the differential signals on the two conductors, but this is of no moment because latch 20 may remain unoperated.

Stray capacitances are associated with each of conductors S0– and S1–, and the stray capacitances are shown by the elements identified by numerals 24. In the quiescent state, when both conductors are at a potential $V_{EE}$, both capacitors 24 charge to this value. During a write operation, one of the conductors is pulled down toward ground, and the respective capacitor discharges. Since the write current is large in magnitude, appreciable capacitor discharging can take place. At the end of the write cycle, since the voltage across a capacitor cannot change instantaneously, the potential of the previously pulled-down conductor remains at a low level even though the previously energized one of transistors T1 and T2 is now off. A read operation cannot be performed immediately because the read currents would be completely masked by the differential potentials which are already present on the two bit-line conductors.

But the system is self restoring in that the pulled-down conductor soon rises in potential to the level $V_{EE}$. For example, consider the case in which transistor T1 was turned on during a write operation and capacitor 24 discharged. At the end of the write cycle, the potential of conductor S0– is less than $V_{EE}$, and consequently current flows from source 16 through resistor 12, conductor S0– and capacitor 24 to ground. The capacitor charges and as soon as it is charged to level $V_{EE}$, current ceases to flow through resistor 12, the potentials of the two conductors are the same, and a read cycle can take place.

Figure 2:
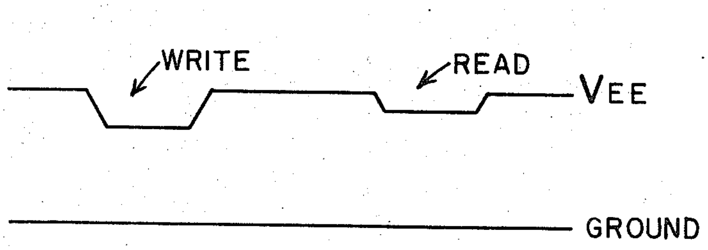
FIG. 2 depicts the potentials which appear on the bit-line conductors during read and write cycles.

FIG. 2 shows typical potentials which appear on conductor S0– or S1– during write and read cycles. The write current is relatively large in magnitude and consequently while one of the conductors is held at the level $V_{EE}$, the other conductor goes quite low in potential. During a read operation, a very small current flows through one of conductors S0– and S1– (while almost no current flows through the other). Consequently, that conductor which conducts current goes low in in potential, but not that significantly relative to the $V_{EE}$ level. Since the difference between the two conductor potentials is so small during a read operation, it is apparent that if the read operation takes place before the recovery operation has been effected, then the read differential signals may be completely masked. It is for this reason that sufficient time must be allowed for complete recovery of the circuit following a write cycle before a read cycle can take place.

Two conventional approaches can be taken for reducing the recovery time. One approach requires the provision of separate bit-line conductor pairs for reading and writing. However, such an arrangement adds a certain level of complexity to the system, is more expensive, and is less reliable. The other approach which may be taken is to use low-magnitude resistors 12 and 14. Since the recovery time is determined by the time required for one of capacitors 24 to charge from source 16, and the charging time is determined by the time constant which is the product of the magnitude of capacitor 24 and the magnitude of one of resistors 12 and 14, the recovery time can be decreased by using low-magnitude resistors. However, it is not feasible to use very low-magnitude resistors because the reliability of the system with respect to reading would be seriously impaired. It must be recalled that a low-magnitude current flows through even that one of conductors S0– and S1– which conducts current during a read operation. The differential signal at the input to sense amplifier 18 is equal to the product of the magnitude of the current and the magnitude of that one of resistors 12 and 14 through which it flows. With low-magnitude sense resistors, the read differential voltage is very small. To insure the proper operation of sense amplifier 18, it is not feasible to utilize low-magnitude resistors.

Figure 3:
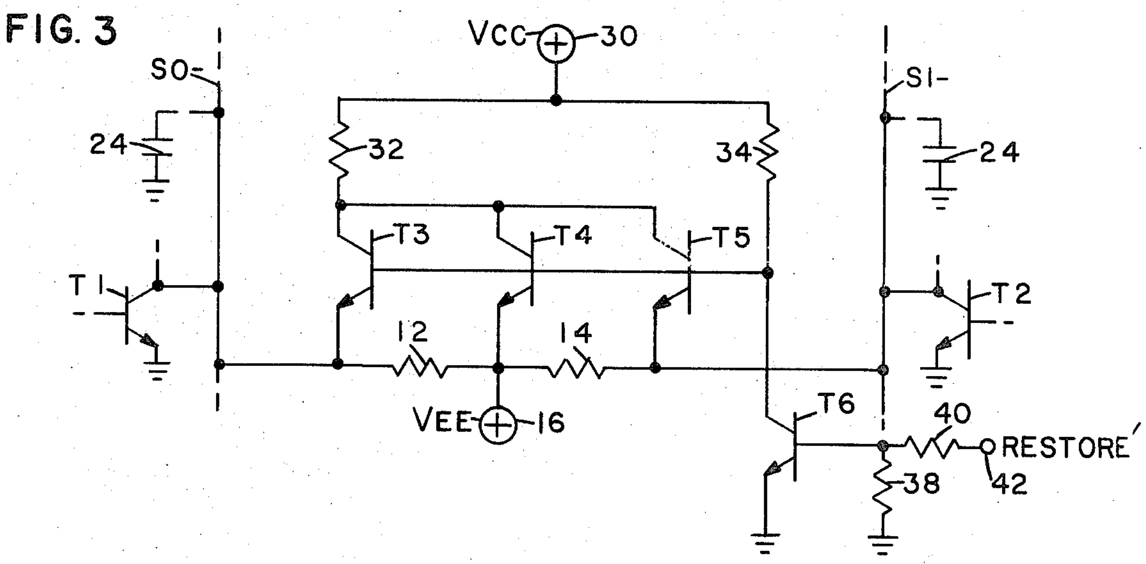
FIG. 3 depicts an illustrative embodiment of the invention and shows the modifications required of each sense latch module of FIG. 1.

FIG. 3 shows the modifications required to each sense latch module in accordance with the principles of our invention. The sense latch module includes the circuitry shown in FIG. 1; source 16 is connected through two respective resistors 12 and 14 to the S0– and S1– conductors, each of the conductors is extended to a sense-amplifier 18 (not shown), one of drive transistors T1 and T2 is connected to each conductor, and a stray capacitor 24 is associated with each conductor. Insofar as a read or write operation is concerned, the circuit of FIG. 3 operates as does the circuit of FIG. 1. But the circuit of FIG. 3 includes three additional transistors T3, T4 and T5 connected in parallel, an additional gating transistor T6 whose collector is connected to the base terminals of the three other transistors, additional resistors and another potential source 30. The magnitude of source 30 — $V_{CC}$ — is higher than that of source 16. Typically, $V_{EE}$ is 5 volts and $V_{CC}$ is 10 volts. It should also be noted, as will be described below, that because the charging current for the discharged one of capacitors 24 following a write cycle does not flow through the respective one of resistors 12 and 14, both resistors may be large in magnitude to insure reliable differential current sensing.

In the quiescent state, the RESTORE' signal at terminal 42 is high and transistor T6 conducts. The collector of transistor T6 is shorted through the transistor to ground, and consequently a potential only slightly above ground is applied to the base of each of transistors T3, T4 and T5; all three of the transistors, whose emitters are held at the potential $V_{EE}$, remain off. The additional circuitry of FIG. 3 thus has no effect during a read or write operation.

Following a write operation, however, the RESTORE' signal goes low to turn off transistor T6. (The RESTORE' signal may be derived from the restore signal on cable 10 of FIG. 1 since in a typical memory array a restore signal is generated following a write cycle. However, a separate source for the restore signal may be provided if desired.) When transistor T6 turns off, the potential of source 30 is extended through resistor 34 to the base of each of transistors T3, T4 and T5. The three transistor collectors are all connected together and extended through resistor 32 to source 30. Since the collectors of the transistors are tied together, as are their bases, the transistor whose emitter potential is at the lowest level (thereby having the largest base-emitter junction drop) not only conducts most heavily but actually "robs" current from the other two transistors. The transistor whose emitter is at the lowest level is the one connected to that one of conductors S0– and S1– whose capacitor 24 is discharged as a result of the previous write operation. Consequently, the current from source 30 flows through one of transistors T3 and T5 and the respective one of conductors S0– and S1– to charge the discharged capacitor 24.

Actually, the other of transistors T3 and T5 also conducts, but to a very small extent, as does transistor T4. The emitter of transistor T4 is held fixed at the $V_{EE}$ level. Conductors S0– and S1– actually charge to potentials slightly above $V_{EE}$. At this time, since the potential of the emitter of transistor T4 is lower than the potentials of emitters T3 and T5, transistor T4 saturates and robs most of the base and collector current. The potentials of conductors S0– and S1– stabilize at a level slghtly above $V_{EE}$, but very near the same voltage. It is the equality of the potentials which is important, and this can be achieved by matching transistors T3 and T5. In fact, if transistors T3 and T5 are part of the same integrated circuit, the potentials of conductors S0– and S1– stabilize within several millivolts of each other.

Resistor 32 functions as the load resistor for transistors T3, T4 and T5, and resistor 34 functions as the base bias resistor when transistor T6 is turned off. The purpose of resistor 38 is to allow transistor T6 to come out of saturation quickly following the recovery procedure when the RESTORE' signal goes high. Resistor 40 functions simply to limit the base current of transistor T6.

By using a large-magnitude source 30, resistors 32 and 34 can be large in magnitude. Even though these resistors determine the charging time constant during the recovery process, the recovery can be made very fast by using a large-magnitude source. It is preferable to use large-magnitude resistors 32 and 34 to reduce the power dissipation of the circuit.

It is thus apparent that following a write cycle, the recovery time is not determined by current flowing from source 16 through one of resistors 12 or 14. Instead, an active device (T4 or T5) supplies charging current to the bit-line conductor which is initially low in potential (with a much smaller charging current being furnished to the other conductor). The potentials of both conductors stabilize at slightly above the $V_{EE}$ level very rapidly.

Figure 4:
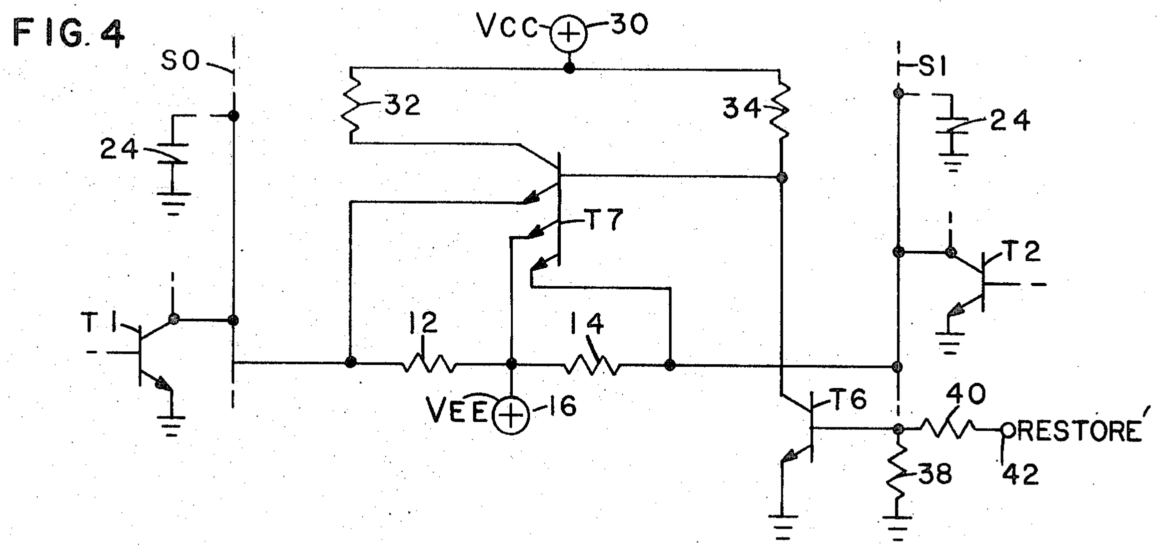
FIGS. 4 and 5 depict two similar but further illustrative embodiments of the invention.

The embodiment of FIG. 4 is very similar to that of FIG. 3 except that instead of utilizing three separate transistors T3, T4 and T5, a single triple-emitter transistor T7 is utilized. The operation of the circuit is the same; instead of three collectors being tied together and three bases being tied together, the triple-emitter transistor is provided wtih a single base and a single collector. (It is also possible to utilize a separate transistor T4, and a double-emitter transistor to replace transistors T3 and T5.)

Figure 5:
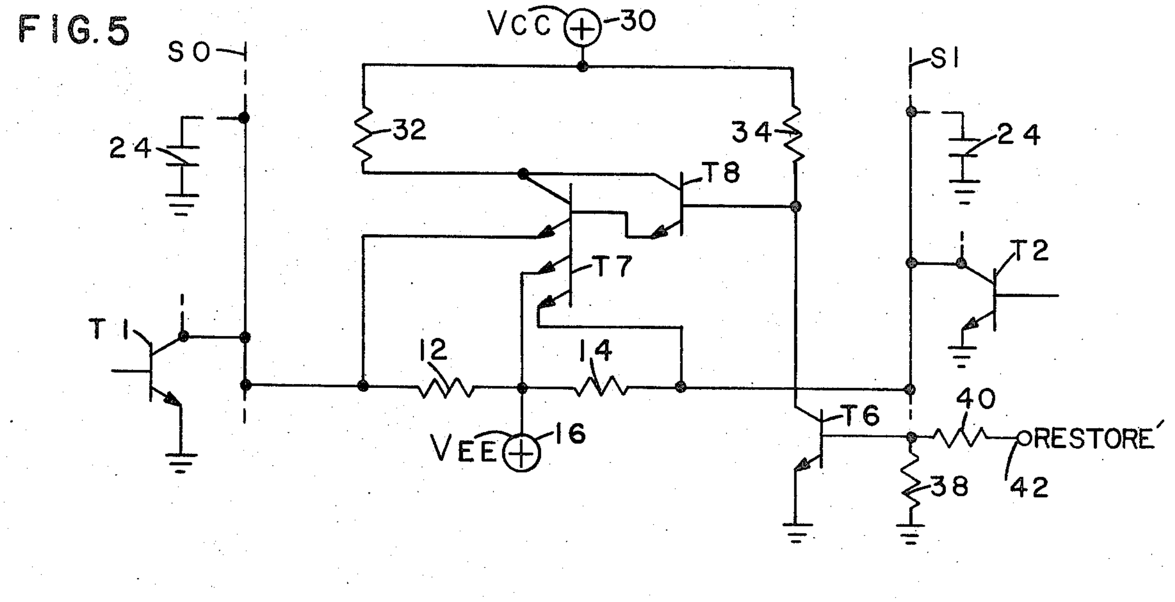

The circuit of FIG. 5 is similar to that of FIG. 4 except that an additional transistor T8 is provided. Transistor T8 serves as a buffer between the collector of transistor T6 and the base of transistor T7, and greatly reduces the injection of noise into conductors S0– and S1– due to parasitic capacitances when the RESTORE' signal goes high to turn off transistor T7. In the absence of transistor T8, when transistor T6 turns on the negative spike at its collector might appear at the emitters of transistors T7, as a result of the stray capacitance coupling between the collector of transistor T6 and the emitters of transistor T7. But with transistor T8 in the circuit, there is capacitance coupling between the collector of transistor T6 and the emitter of transistor T8, and between the emitter of transistor T8 and the emitters of transistor T7. The additional stage of capacitance coupling which is introduced in the circuit by transistor T8 cuts down any spikes which might be induced in the bit-line conductors. The provision of transistor T8, in a standard Darlington configuration, also prevents saturation of transistor T7 so that the transistor turns off quickly when the RESTORE' signal goes high at the end of the recovery procedure.

In one circuit which was constructed and found to greatly reduce the recovery time, the magnitude of $V_{EE}$ was 5 volts and the magnitude of $V_{CC}$ was 10 volts. The six resistors of FIG. 5 had the following component values:

| Resistor | Magnitude |
|---|---|
| 12 | 1K |
| 13 | 1K |
| 32 | 1.5K |
| 34 | 5K |
| 38 | 1K |
| 40 | 1.8K |

Although the invention has been described with reference to particular embodiments, it is to be understood that these embodiments are merely illustrative of the appliction of the principles of the invention. Numerous modifications may be made therein and other arrangements may be devised without departing from the spirit and scope of the invention.

What we claim is:

1. A circuit for reducing the recovery time following the write cycle of a semiconductor memory, said semiconductor memory including a pair of bit-line conductors, means for applying write differential signals thereto and means for sensing read differential signals thereon, said sensing means including a source of potential and a pair of resistor means connected respectively between said source of potential and respective ones of said conductors, said pair of resistor means being directly connected to said source of potential at one end of each of said pair of resistor means, comprising first and second transistor means each connected to the other end of one of said pair of resistor means and to a respective one of said conductors for equalizing the potentials thereof, and control means for operating said first and second transistor means following a write cycle, each of said first and second transistor means includes emitter, base and collector terminals, the emitter terminal of each of said first and second transistor means being connected to a respective one of said bit-line conductors, and further including third transistor means having emitter, base and collector terminals, the emitter terminal of said third transistor means being connected to the junction of said pair of resistor means, means for providing a shared base circuit for said first, second and third transistor means, and means for providing a shared collector circuit for said first, second and third transistor means, said control means being further operative to operate said third transistor means together with said first and second transistor means, said control means includes fourth transistor means connected to the shared base circuit for simultaneously forward-biasing the emitter-base junctions of all three of said first, second and third transistor means, further including fifth transistor means connected between said common base circuit and said fourth transistor means for isolating said fourth transistor means from said first, second and third transistor means, said fifth transistor means is connected in a Darlington configuration with said first, second and third transistor means.

* * * * *